United States Patent
Li et al.

(10) Patent No.: US 10,198,624 B2
(45) Date of Patent: Feb. 5, 2019

(54) SEGMENTATION-GUIDED REAL-TIME FACIAL PERFORMANCE CAPTURE

(71) Applicant: Pinscreen, Inc., Westlake Village, CA (US)

(72) Inventors: Hao Li, Santa Monica, CA (US); Tianye Li, Los Angeles, CA (US); Shunsuke Saito, Los Angeles, CA (US)

(73) Assignee: Pinscreen, Inc., Santa Monica, CA (US)

( * ) Notice: Subject to any disclaimer, the term of this patent is extended or adjusted under 35 U.S.C. 154(b) by 144 days.

(21) Appl. No.: 15/438,551

(22) Filed: Feb. 21, 2017

(65) Prior Publication Data

US 2017/0243053 A1    Aug. 24, 2017

Related U.S. Application Data

(60) Provisional application No. 62/297,059, filed on Feb. 18, 2016.

(51) Int. Cl.
| | |
|---|---|
| *G06K 9/00* | (2006.01) |
| *G06T 7/11* | (2017.01) |
| *G06K 9/46* | (2006.01) |
| *G06T 7/143* | (2017.01) |
| *G06T 7/194* | (2017.01) |

(52) U.S. Cl.
CPC ..... *G06K 9/00281* (2013.01); *G06K 9/00234* (2013.01); *G06K 9/4628* (2013.01);
(Continued)

(58) Field of Classification Search
None
See application file for complete search history.

(56) References Cited

U.S. PATENT DOCUMENTS

| | | | |
|---|---|---|---|
| 9,129,148 B1* | 9/2015 | Li | G06K 9/00268 |
| 9,430,817 B2* | 8/2016 | Schelten | G06T 5/003 |
| 9,652,890 B2* | 5/2017 | Beeler | G06T 17/20 |
| 2011/0081089 A1* | 4/2011 | Mori | G06K 9/00281 |
| | | | 382/218 |

(Continued)

OTHER PUBLICATIONS

Long, Jonathan, Evan Shelhamer, and Trevor Darrell. "Fully convolutional networks for semantic segmentation." Proceedings of the IEEE conference on computer vision and pattern recognition. 2015. (Year: 2015).*

(Continued)

*Primary Examiner* — Vu Le
*Assistant Examiner* — Samah A Beg
(74) *Attorney, Agent, or Firm* — Socal IP Law Group LLP; Jonathan Pearce (57) ABSTRACT

There is disclosed a system and method of performing facial recognition from RGB image data. The method includes generating a lower-resolution image from the RGB image data, performing a convolution of the lower-resolution image data to derive a probability map identifying probable facial regions and a probable non-facial regions, and performing a first deconvolution on the lower-resolution image using a bilinear interpolation layer to derive a set of coarse facial segments. The method further includes performing a second deconvolution on the lower-resolution image using a series of unpooling, deconvolution, and rectification layers to derive a set of fine facial segments, concatenating the set of coarse facial segments to the set of fine facial segments to create an image matrix made up of a set of facial segments, and generating a binary facial mask identifying probable facial regions and probable non-facial regions from the image matrix.

20 Claims, 6 Drawing Sheets

(52) U.S. Cl.
CPC ................ *G06T 7/11* (2017.01); *G06T 7/143* (2017.01); *G06T 7/194* (2017.01); *G06T 2207/10024* (2013.01); *G06T 2207/20016* (2013.01); *G06T 2207/20076* (2013.01); *G06T 2207/20081* (2013.01); *G06T 2207/30201* (2013.01)

(56) References Cited

U.S. PATENT DOCUMENTS

| | | | | |
|---|---|---|---|---|
| 2015/0317511 | A1* | 11/2015 | Li | G06K 9/00288 |
| | | | | 382/118 |
| 2016/0328630 | A1* | 11/2016 | Han | G06K 9/4628 |
| 2017/0083752 | A1* | 3/2017 | Saberian | G06T 3/40 |
| 2018/0075581 | A1* | 3/2018 | Shi | G06T 3/4053 |
| 2018/0137388 | A1* | 5/2018 | Kim | G06K 9/627 |
| 2018/0158240 | A1* | 6/2018 | Saito | G06T 17/20 |

OTHER PUBLICATIONS

Noh, Hyeonwoo, Seunghoon Hong, and Bohyung Han. "Learning deconvolution network for semantic segmentation." Proceedings of the IEEE international conference on computer vision. 2015. (Year: 2015).*

Weise, Thibaut, et al. "Realtime performance-based facial animation." ACM transactions on graphics (TOG). vol. 30. No. 4. ACM, 2011. (Year: 2011).*

Luc, Pauline, et al. "Semantic segmentation using adversarial networks." arXiv preprint arXiv:1611.08408 (2016). (Year: 2016).*

Saito, Shunsuke, Tianye Li, and Hao Li. "Real-time facial segmentation and performance capture from rgb input." European Conference on Computer Vision. Springer, Cham, 2016. (Year: 2016).*

Ghiasi, Golnaz. Recognizing and Segmenting Objects in the Presence of Occlusion and Clutter. Diss. UC Irvine, 2016. (Year: 2016).*

Gauthier, Jon. "Conditional generative adversarial nets for convolutional face generation." Class Project for Stanford CS231N: Convolutional Neural Networks for Visual Recognition, Winter semester May 2014 (2014): 2. (Year: 2014).*

Denton, Emily L., Soumith Chintala, and Rob Fergus. "Deep generative image models using a OBJ laplacian pyramid of adversarial networks." Advances in neural information processing systems. 2015. (Year: 2015).*

Hsieh, Pei-Lun, et al. "Unconstrained realtime facial performance capture." Proceedings of the IEEE Conference on Computer Vision and Pattern Recognition. 2015. (Year: 2015).*

* cited by examiner

SEGMENTATION-GUIDED REAL-TIME FACIAL PERFORMANCE CAPTURE

RELATED APPLICATION INFORMATION

This patent claims priority from U.S. provisional patent application No. 62/297,059 entitled "Real-Time Facial Segmentation from RGB Video for Facial Performance Capture and Manipulation Under Occlusions" filed Feb. 18, 2016.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to real-time facial segmentation and performance capture from RGB input.

Description of the Related Art

There is a great deal of research related to three-dimensional, real-life modeling and facial capture. Most capture systems that provide any degree of accuracy and fidelity are based upon a series of capture points (e.g. fiducial markers) placed upon a body or face for later identification in post-processing of the associated video. Most individuals are familiar with a series of "white dots" placed at various places upon a human body or on a face itself so that those "white dots" may be identified automatically by computer modeling systems after the associated video of the individual or face has been captured. Those dots may then be used to extrapolate lifelike motion onto computer-generated models (e.g. the character Gollum in the Lord of the Rings series of movies whose actions were actually captured acting by a human individual wearing a suit and facial mask of white dots and thereafter translated onto the computer generated character of Gollum).

Similarly, other systems rely upon white dots or other markers on an individual's face so as to capture acting and other facial motions on a human that may be translated into a computer-generated character's face during post processing. But, these systems either require too much setup or are generally incapable of functioning in real-time (e.g. near-simultaneously with the image capture). Instead, these systems rely upon computer function, and sometimes a great deal of processing power over hours of time, for a given even seconds-long video. And, as should be obvious, these systems rely upon a great deal of setup including adding all of those white dots to a person's body or face, green screens for filming in front of, and matching a particular model (e.g. a computer-generated face or body) to the associated white dots.

In a related field, there exist many facial capture or facial recognition systems that rely upon natural landmark detection. These types of systems typically identify a set of facial landmarks (e.g. the center and edges of both eyes, the center and nostrils of a nose, the center top, center bottom, and each corner of a mouth) to identify a particular individual or to identify a facial position. More sophisticated systems of these types can rely upon facial three-dimensional modeling. However, most of these systems rely upon visibility of a substantial number of those facial landmarks. So, if many or sometimes even only a few of those facial landmarks are covered by a person's hair, hands, or some other obstruction, facial identification or capture systems like these typically function poorly or not at all. They become unable to identify an individual or unable to readily identify the position or pose (much less facial positions such as frowning, mouth open, etc.). Those that rely upon facial three-dimensional modeling likewise fail when faces are partially occluded because these systems have trouble extrapolating a facial mask and pose from a limited data set including an occluded face.

Still other systems, more closely related to the present system, are capable of near real-time operation by relying upon convolutional neural networks trained with facial data so as to identify facial portions of an RGB image (without three-dimensional data). However, these systems typically have difficulty dealing with occlusions (e.g. hands in front of the face, shadows, hair, or otherwise portions of the face being blocked). These systems either misidentify faces or misidentify non-faces as facial regions when presented with occluded images. To deal with occlusions, some of these systems apply depth data (e.g. three-dimensional scanning, for example, using a LIDAR) in addition to two-dimensional (in space, as opposed to color depth) image data. By adding depth data, these systems can much more accurately identify most occlusions. But, reliance upon depth sensors requires the presence of the depth sensors that, at present, are not common on most sources of RGB image data like mobile phones and standard digital video cameras.

It is therefore desirable to enable real-time facial segmentation and performance capture using only RGB input data and, in particular, such a system that is capable of robust handling of image occlusions like similar skin-based occlusions (e.g. hands) covering some of a facial region.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Recent advances in mobile technology along with AR and VR technology, which primarily have been to reduce their cost along with improving their quality and computing power, have made the applications of real-time facial tracking more feasible. Still, most solutions available are generally prohibitively computing power intensive or require too much specialized equipment (e.g. depth sensors) or require pre-planning and set-up. These limitations make them unsuitable for general public use. Enabling real-time facial segmentation and performance capture using standard or near-standard computing devices or mobile devices is highly desirable, for example, to enable interactivity in VR or AR environments, for augmentation or interaction with user avatars in three-dimensional environments, or to enable real-time facial replacement for humor or other effects, and for other as-of-yet unknown applications.

The present system extends the state of the art technology to apply well-trained convolutional neural networks to provide real-time facial tracking, segmentation, and performance capture with incredible accuracy, while dealing effectively with difficult occlusions. As used herein, the phrase "real-time" means of or on the order of milliseconds. Real-time is sufficiently fast that delay between individual action captured in a video stream, and the segmentation and performance capture used to perform facial replacement or retargeting within the video stream, is imperceptible or nearly-imperceptible to the human eye. "Real-time" is sufficiently fast that a video stream may be altered with facial replacement or retargeting without any substantial delay, due to the segmentation and performance capture, of an otherwise unaltered video stream.

Figure 1:
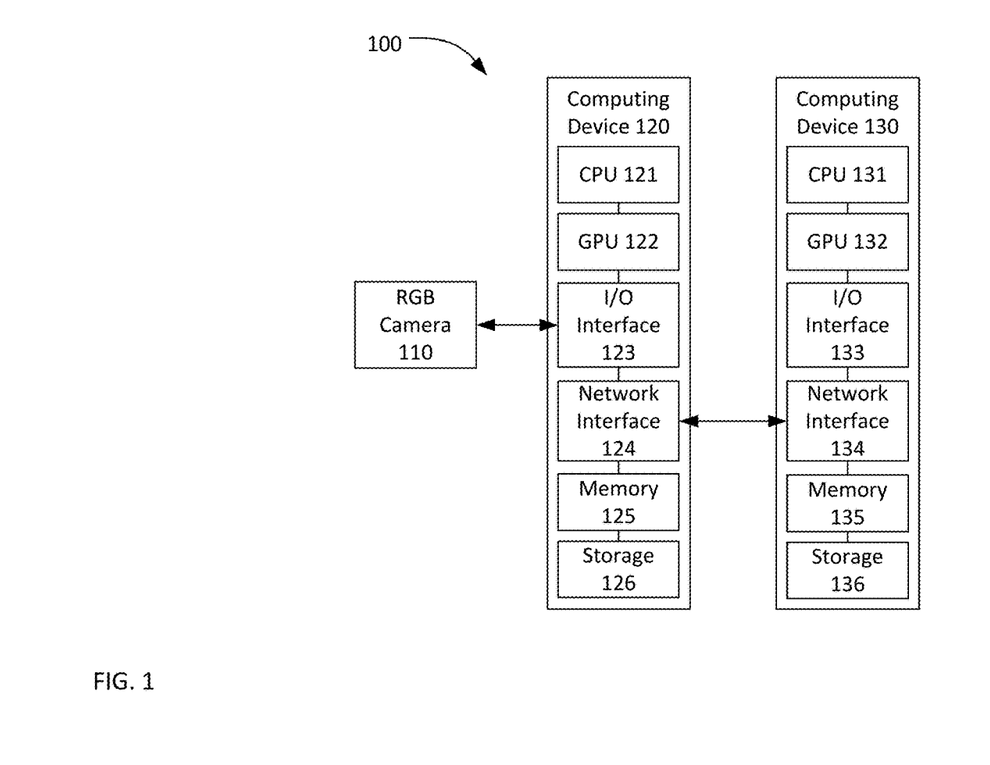
FIG. 1 is a structural diagram of a system for performing real-time facial segmentation and performance capture from RGB input.

Turning to FIG. 1, a structural diagram of a system 100 for performing real-time facial segmentation and performance capture from RGB input is shown. The system 100 includes an RGB camera 110 and at least one computing device 120. A second computing device 130 is optional, depending on the requirements of the specific implementation.

The RGB camera 110 may be a still camera or, preferably, a video camera capturing an image. The video image created by the RGB camera 110 is, as is any digital video, actually a series of still frames strung together in rapid succession to create the illusion of movement within an associated display when viewed. Throughout the present description, unless otherwise noted, reference to "RGB input" or an "RGB image" or "image data" means a single frame of an RGB video data stream. The systems and processes described herein operate upon a single frame of an RGB video data stream, but the systems and processes may be applied repeatedly and in rapid succession to each frame of an RGB video data stream, sometimes with reliance upon data from the preceding frame or frames, to continually generate facial data for each frame.

The computing device 120 includes a central processing unit (CPU) 121, a graphics processing unit (GPU) 122, an input-output (I/O) interface 123, a network interface 124, memory 125, and storage 126.

The CPU 121 may execute instructions associated with an operating system for the computing device 120 as well as instructions associated with one or more applications suitable for enabling the functions described herein. The CPU 121 may be or include one or more microprocessors, microcontrollers, digital signal processors, application specific integrated circuits (ASICs), or a system-on-a-chip (SOCs). The CPU 121 may be specialized, designed for operations upon visual, graphical, or audio data or may be general purpose processors. Though identified as a central processing unit, the CPU 121 may in fact be multiple processors, for example multi-core processors or a series of processors joined by a bus to increase the overall throughput or capabilities of the CPU 121.

The GPU 122 may execute instructions suitable for enabling the functions described herein. In particular, the GPU 122 may be used in connection with particular image-related operations which the GPU 122 is uniquely suited to perform. The GPU 122 may be any of the things that the CPU 121 is. However, the GPU 122 is distinct in that it is a specialized processor that is designed for the purpose of processing visual data, particularly vector, shading, faster memory operations and access, along with performing specialized lighting operations. The instruction sets and memory in the GPU 122 are specifically designed for operation upon graphical data. In this way, the GPU 122 may be especially suited to operation upon the RGB image data or to quickly and efficiently performing the complex mathematical operations described herein. Like the CPU 121, the GPU 122 is shown as a single graphics processing unit, but may actually be one or more graphics processing units in a so-called multi-core format or linked by a bus or other connection that may together be applied to a single set of or to multiple processing operations.

The I/O interface 123 may include one or more general purpose wired interfaces (e.g. a universal serial bus (USB), high definition multimedia interface (HDMI)), one or more connectors for storage devices such as hard disk drives, flash drives, or proprietary storage solutions.

The network interface 124 may include radio-frequency circuits, analog circuits, digital circuits, one or more antennas, and other hardware, firmware, and software necessary for network communications with external devices. The network interface 124 may include both wired and wireless connections. For example, the network may include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol.

The network interface 124 may include one or more specialized processors to perform functions such as coding/decoding, compression/decompression, and encryption/decryption as necessary for communicating with external devices using selected communications protocols. The network interface 124 may rely on the CPU 121 to perform some or all of these functions in whole or in part.

The memory 125 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 125 may store software programs and routines for execution by the CPU 121 or GPU 122 (or both together). These stored software programs may include operating system software. The operating system may include functions to support the I/O interface 123 or the network interface 124, such as protocol stacks, coding/decoding, compression/decompression, and encryption/decryption. The stored software programs may include an application or "app" to cause the computing device to perform portions or all of the processes and functions described herein. The words "memory" and "storage", as used herein, explicitly exclude transitory media including propagating waveforms and transitory signals.

Storage 126 may be or include non-volatile memory such as hard disk drives, flash memory devices designed for long-term storage, writable media, and other proprietary storage media, such as media designed for long-term storage of image data.

The computing device 130 includes the same central processing unit (CPU) 131, graphics processing unit (GPU) 132, input-output (I/O) interface 133, network interface 134, memory 135, and storage 136 as the computing device 120. The discussion of their function will not be duplicated here. However, the computing device 130 is entirely optional and may be removed in some or even the preferred implementation.

However, in some cases, the computing device 130 may be connected by the network interface 124 to the network interface 134 which may be a wired interface, such as Ethernet, universal serial bus (USB), or a wireless interface such as 802.11x, LTE, or other wireless protocol to enable the computing device 130 to perform some or all of the operations discussed herein. For example, the CPU 131 and GPU 132 of the computing device 130 may be more powerful or may be implemented as an array of interconnected CPUs (e.g. a multicore process or group of multicore processors) or a group of GPUs (e.g. a single powerful GPU or a set of GPUs interconnected by SLI or CrossFire®) such that the computing device 130 is better-capable of performing processor-intensive tasks such as the convolution or segmentation processes discussed more fully below. In some implementations, the computing device 130 may be used to perform more processer-intensive tasks, with the tasks being offloaded via the I/O interface 123 or network interface 124 (and received by the I/O interface 133 or the network interface 134).

Figure 2:
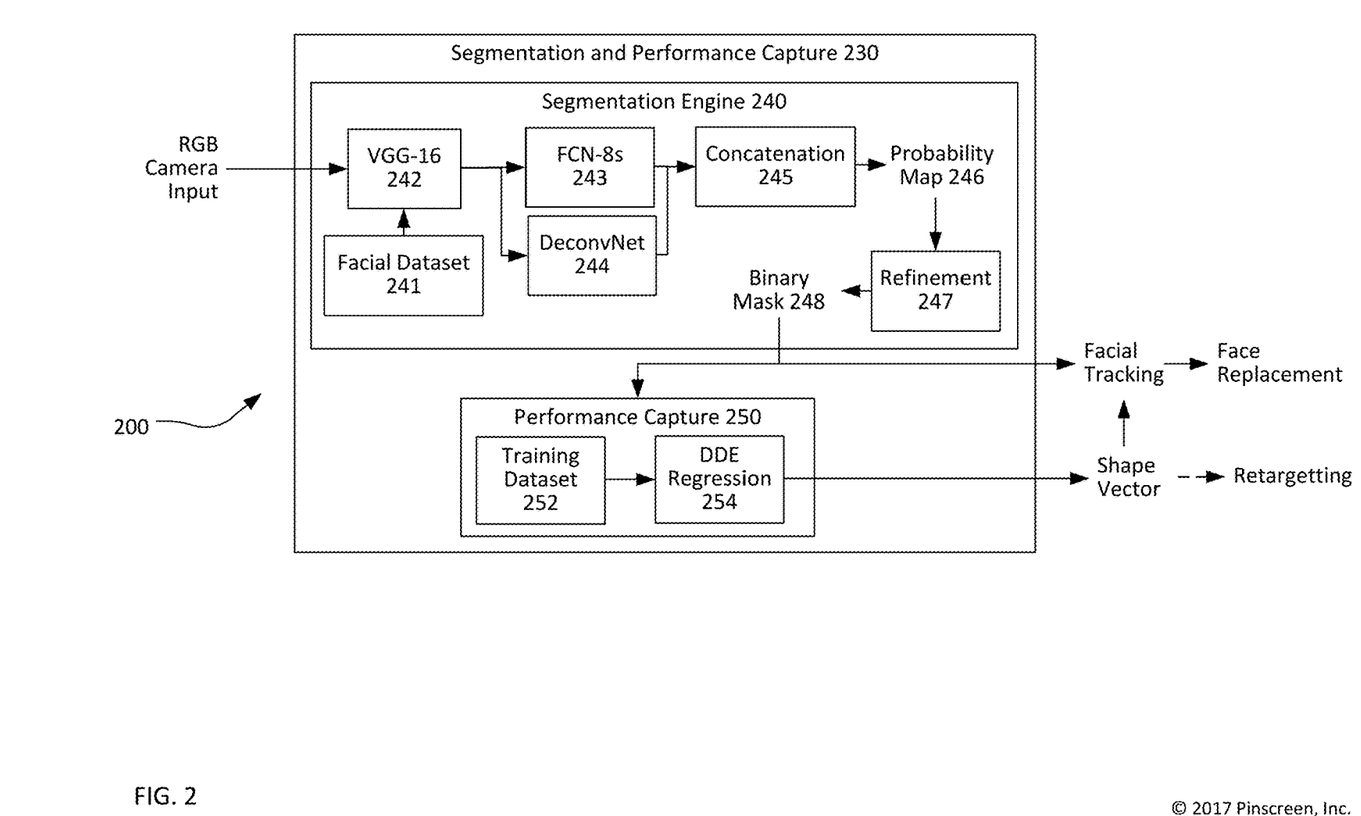
FIG. 2 is a functional diagram of a system for performing real-time facial segmentation and performance capture from RGB input.

FIG. 2 is a functional diagram of a system 200 for performing real-time facial segmentation and performance capture from RGB input. The system 200 includes segmentation and performance capture 230 made up of both a segmentation engine 240 and performance capture 250. The components identified in the structural diagram of the system 100 (FIG. 1) together or individually perform the functions described herein through the application of suitable executable software instructions.

First, RGB camera input is generated (for example by the RGB camera 110). As discussed above, this image data is a single frame of an on-going video stream. This system may independently operate upon each image frame from the on-going video stream. The RGB camera input is received into the segmentation engine 240 first by a VGG-16 (Visual Geometry Group 16-layer) 242 convolutional neural network. This is a convolutional network consisting of 16 layers. The VGG-16 242 is one example of a convolutional neural network that is well-suited to facial recognition because it is deep, but not particularly time-consuming when its initial filter is set to 3 by 3. Though the VGG-16 242 is shown, other convolutional neural networks such as VGG-19 or still other networks may be used as further advances to accuracy and speed are made.

The VGG-16 242 uses 16 layers, with a total of five pooling layers, to extract multidimensional feature map for the RBG camera input (presumably including a face). The VGG-16 242 used for the current processes is trained on a particular facial dataset 241. The facial dataset 241 may rely upon a known set of publicly-available trained faces and non-faces and that has been pre-segmented. However, the facial dataset 241 used by the present system is further augmented with a large dataset of additional images. Specifically, the facial dataset 241 used for training is trained on a much larger set of facial images that are prepared with facial and non-facial regions properly flagged. Then, in addition, a similar or identical facial dataset is added to the training set but with the images including intentional occlusions such as non-skin-colored rectangles, triangles and circles covering portions of the individuals faces. An additional training dataset is added with skin-toned occlusions such as hands, arms and other skin toned occlusions under various lighting conditions. For example, under certain lighting, hands and arms may appear the same color or may appear to be a slightly different color than a face behind the hand or arm due to shadowing or brighter lights on closer objects. The training set is also further augmented with negative samples (non-face samples). This large and varied training data set enables the convolutional neural network to effectively segment and to avoid overfitting.

For VGG-16 242, pre-trained weightings are applied. To speed the operation of VGG-16 242, the first fully connected layer of the convolutional neural network is intentionally modified to be much smaller (e.g. a 4×4 kernel size) which enables the system to operate in real-time. The first fully connected layers and deconvolution layers may be initialized with zero-mean Gaussians. The loss function is the sum of softmax functions applied to the outputs of DeconvNet 244, FCN-8s 243 and their associated score maps, with weightings of 0.5, 0.5 and 1.0, respectively. The loss functions are minimized by stochastic gradient descent (SGD). Only DeconvNet 244, and not FCN-8s, is trained with weightings of 0.01, 0.9 and 0.0005 as the learning rate, momentum, and weight decay, respectively. The training may be completed in approximately 9 hours under current technology. Other weightings and training times may be used or may result as technology improves or as refinements to the system are made.

The system relies upon applying the training facial dataset 241 to VGG-16 242 which is based upon the Visual Geometry Group's very deep convolutional network. The convolutional network VGG-16 242 may be applied to perform feature extraction (e.g. to identify probable facial and non-facial regions). As the VGG-16 242 convolutional network operates, it generates intermediate data including a series of pooling layers. The intermedia data may be processed by the associated deconvolutional networks FCN-8s 243 and DeconvNet 244 (discussed below) to enable the creation of a much more accurate and finely grained probability map.

The probable facial and non-facial regions are identified by the VGG-16 242 convolutional neural network as intermediate data including a series of pooling layers. The deconvolutional networks FCN-8s 243 and DeconvNet 244 can be passed the portions of the input image upon which to perform segmentation. The first fully-connected layer of the DeconvNet begins at 4 by 4 pixels to speed the deconvolution.

The FCN-8s 243 operates substantially simultaneously on the same 128×128 probability map, but its default output size is incorrect for concatenation with the results of the DeconvNet 244 operations. Zero padding may be used for each deconvolution so that the size of each activation layer is aligned with the output of the previous pooling layer of the VGG16 242 convolution. Also, the FCN-8s 243 relies upon the last pooling layer (e.g. the one preceding the immediate deconvolution during the convolution process) as the coarsest prediction to preserve spatial information in the resulting image. The process is repeated and fused with the output of pooling layers 4 and 3 from the VGG-16 242 convolutional network. Finally, the fused prediction is upsampled to the same resolution as the RGB camera input image.

In the concatenation 245 process, the final output of DeconvNet 244 and FCN-8s 243 are concatenated into a single matrix and a 1 by 1 convolution is applied to generate a fused facial probability map. Blending weights are used during these convolutions to select the relative relevance of each of the two convolutions. A softmax operation is applied to produce a final, fused probability map 246 identifying probably facial and non-facial regions.

The output may be refined at 247 by converting the original 128×128 probability map generated by the concatenation process 245 into a binary mask 248 using a Graph-Cut algorithm. This refinement can reduce minor artifacts within a facial or non-facial region and at boundaries between facial and non-facial regions. In order to do so, the following graph cut optimization may be used:

$$\sum_i \theta_i(p_i) - \lambda \sum_{(i,j)} \theta_{i,j}.$$

Here, the energy term between adjacent pixels i and j are optimized. The $\theta_i(p_i)$ is determined by the facial probability map $p_i$, defined as $\theta_i(m)=-\log(p_i)$ for the sink $\theta_i(p_i)=-\log(1.0-p_i)$ for the source. The pairwise term $\theta_{i,j}=\exp(-\|I_i-I_j\|^2/2\sigma)$, where I is the pixel intensity, $\lambda=10$, and $\sigma=5$. The final binary mask 248 is then binlinearly upsampled to the original image resolution.

Following facial segmentation using the segmentation engine 240, performance capture 250 takes place. In this stage, the facial performance is regressed using a DDE (displaced dynamic expression) 254 from the RGB camera input image frame. The DDE regression 254 relies upon a training dataset 252. Training dataset 252 is generated by constructing ferns of primitive regressors and specifying F pairs of feature point indices based upon facial images within the training dataset 252 including ground truth facial shape parameters. Ground truth parameters $\{s_i^g\}_{i=1}^M$ from the set of images $\{I_i\}_{i=1}^M$ and landmarks $\{P_i\}_{i=1}^M$. Given landmarks P, the parameters of the ground truth $S^g$ are computed by minimizing the function:

$$\theta(R, t, x, u, f) = \sum_{i=1}^m \left\| \prod_f (R \cdot (b_0^j(u) + B^i(u) \cdot x) + t) - p_i \right\|^2.$$

During training, the performance capture 250 system is trained with various rotations, translations, blendshape coefficients, identify coefficients, and focal lengths across the images. In this way, the system can be taught to recognize virtually any pose of a human face, even when presented with limited data (e.g. occlusions). The DDE Regression 254 attempts to identify a three-dimensional pose for a human face from the two-dimensional source image, in part relying upon the binary mask 248 supplied by the segmentation engine 240.

During the DDE regression 254, the binary mask 248 is used, but the regressors $R_i(I, P_i, M)$ are prevented (both during operation and during training) from inference based upon non-facial pixels I. The DDE regression 254 is further enhanced by knowledge derived from the facial position generated for an immediately preceding image frame. The DDE regression 254 generates a shape vector for the two-dimensional face presented as a shape vector (representative of a three-dimensional facial model) in a particular pose or with a particular expression, based upon the ground truth training dataset 252, including the preceding frame, and based upon a two-dimensional projection of feature points.

Figure 6:
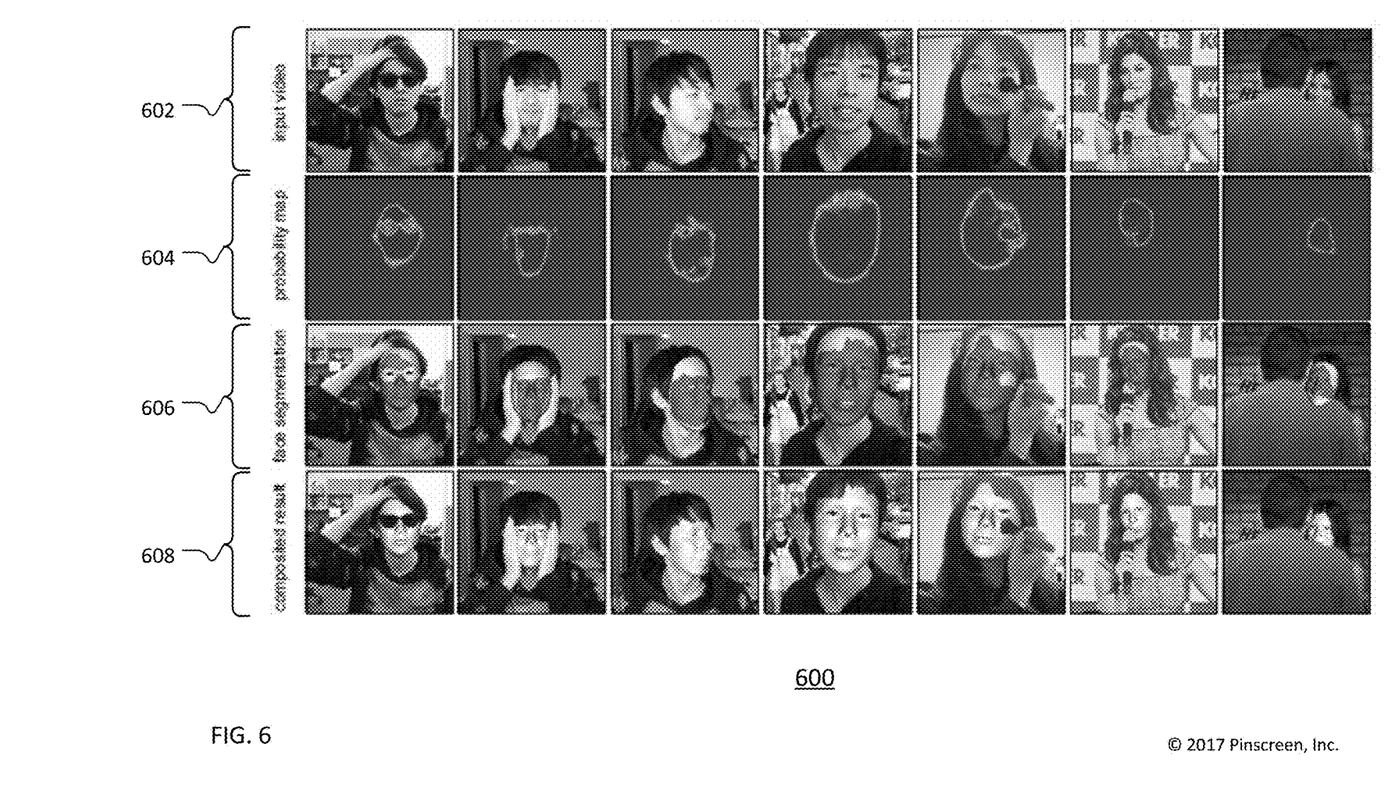
FIG. 6 is a series of images showing RGB input images, probability maps, facial segmentation and composite results from application of a system for real-time facial segmentation and performance capture from RGB input.

The binary mask 248 may be fused with the resulting shape vector to generate real-time facial tracking. Examples of the result of this process may be seen in FIG. 6, with an input RGB video frame shown in row 602. The corresponding probability map in row 604 showing the probable facial (outlined in white) and non-facial (outside of the outline) regions. The portions of the face identified following segmentation are shown in row 606 (the darker portions over a white facial mask). Finally, the composited result of the binary mask 248 combined with the segmented face are shown in row 608. The lighter portions notably do not include hair, hands, eyeglasses, or makeup brushes that otherwise appear in facial regions, but that have been identified by the system 200 as non-facial regions. The resulting facial tracking is therefore suitable for face replacement or retargeting while preserving the characteristics of the face and any occlusions in the images.

Figure 3:
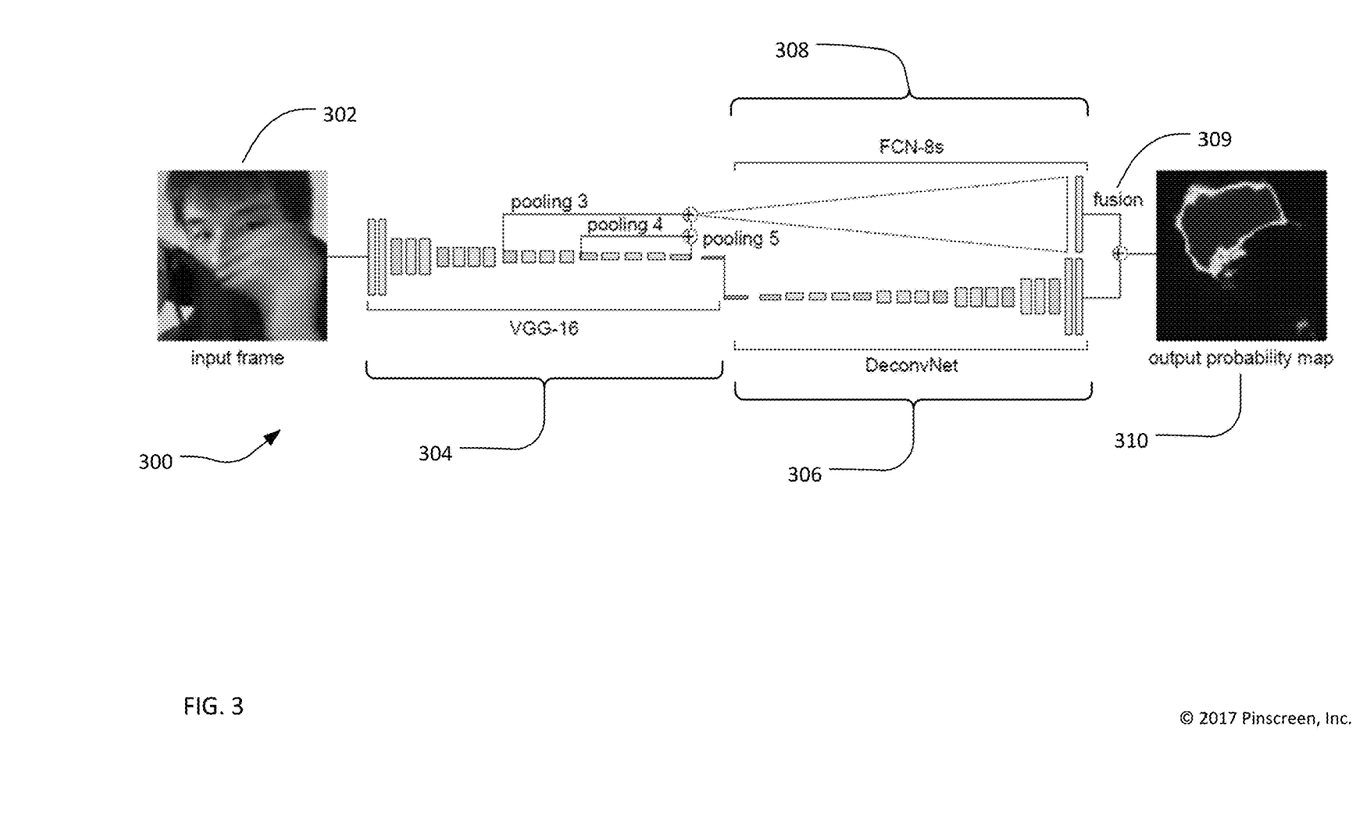
FIG. 3 is a visualization showing the operation of convolutional and deconvolutional neural networks within a system for real-time facial segmentation and performance capture from RGB input.

FIG. 3 is a visualization 300 showing the operation of convolutional and deconvolutional neural networks within a system for real-time facial segmentation and performance capture from RGB input. Specifically, an input image frame 302 is shown as a black and white image, with some motion blur and with the individual's face occluded by a shirt and a hand. In particular, the hand presents skin-tone colored occlusion that is likely quite similar to a human face. The motion blur only adds to the difficulty in appropriate segmentation.

As discussed above, the VGG-16 304 (242 in FIG. 2) convolutional network includes a series of convolutional layers resulting in feature identification. The FCN-8s 308 (243 in FIG. 2) deconvolutional network performs a single deconvolution using a single bilinear interpolation layer to provide a coarse shape segmentations for the facial region identified by VGG-16 304. The DeconvNet 306 (244 in FIG. 3) performs a series of deconvolutions, unpooling, and rectifications to generate detailed shape segmentations for the facial region. The VGG-16 304, FCN-8s 308 and DeconvNet 306 share convolution layers to reduce the overall number of parameters and complexity of the associated work to enable the overall system to operate in real-time (on the order of milliseconds per frame under current technology).

At fusion 309, a final convolution merges the results of the two deconvolutional neural networks into a single output probability map. The result is an output probability map 310 (246 in FIG. 2). A graph cut algorithm is applied to the resulting probability map 310 which is then upsampled to the resolution of the original input image using bilinear interpolation to derive a facial region and non-facial region binary mask 248 (in FIG. 2).

Description of Processes

Figure 4:
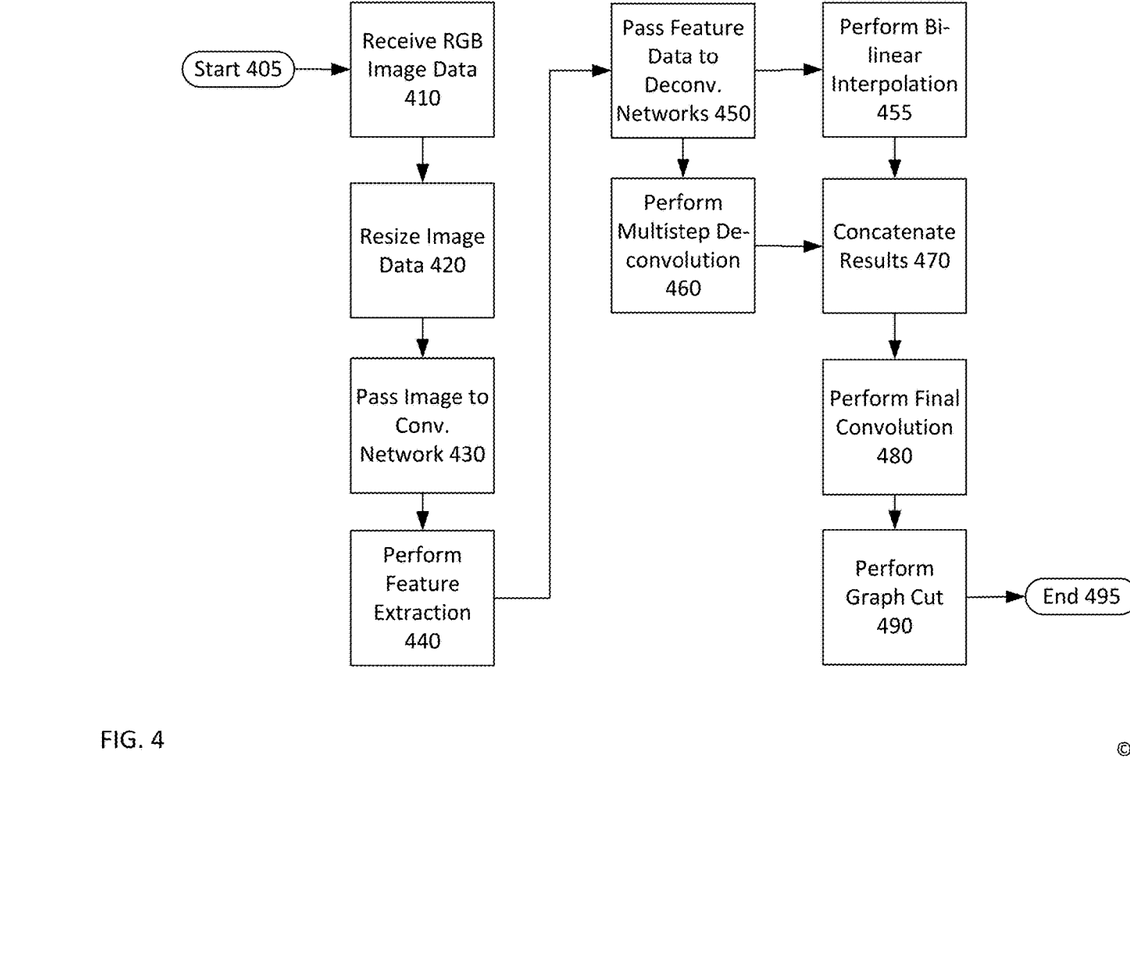
FIG. 4 is a flowchart of operation of convolutional and deconvolutional neural networks within a system for real-time facial segmentation and performance capture from RGB input.

FIG. 4 is a flowchart of operation of convolutional and deconvolutional neural networks within a system for real-time facial segmentation and performance capture from RGB input. The process begins at start 405 and ends at end

495. Although shown as a single process, many iterations of this process may be ongoing substantially simultaneously for each successive input RGB frame of image data. Specifically, RGB video cameras by design capture multiple frames per second (e.g. 24, 30, 60, or more) to generate video streams that represent motion within the stream. This process occurs independently for each of those captured frames. In some cases, this process may only occur for a subset of frames within a video stream in order to speed operation or to lower the overall system requirements for real-time operation.

Following the start 405, RGB image data is received at 410. As discussed above, the RGB image data is an image frame from a video stream. The image frame has a resolution of sufficiently-high quality that it may be viewed on a computer monitor or television screen without substantial artifacts or degradation of the visual quality. The RGB image data is captured by an RGB camera (e.g. RGB camera 110 in FIG. 1) attached to a computing device (e.g. computing device 120 in FIG. 1).

Following receipt of the image data at 410, the image is resized at 420. This is intentional so as to lower the computational intensity of the calculations required by the convolutional network. Preferably, under current technological constraints, an input image data at 420 is first cropped to focus on the likely facial region, then that cropped image is resized to a 128×128 pixel resolution image.

This image is passed to the convolutional network at 430 for feature extraction at 440. During feature extraction, the convolutional network (VGG-16 242 in FIG. 2) generates a probability map of probable facial and probable non-facial regions. The output map is a matching 128×128 pixels.

The extracted interim probability map is passed to two deconvolutional neural networks at 450 which substantially simultaneously perform bi-linear interpolation at 455 and perform multistep deconvolution at 460. The bi-linear interpolation at 455 consists of a single step of bilinear interpolation on the 128×128 probability map to generate a coarse segmentation map of the probable overall facial and non-facial regions.

The multistep deconvolution at 460 entails multiple series of unpooling (inverse of pooling), deconvolution, and rectification layers to generate a very detailed segmentation. The resulting segmentation includes much more erroneous data, but is much more fine in detail.

Prior art methods have suggested that a bi-linear interpolation and multi-step deconvolution could be averaged to derive the benefits of both networks on the same data set. However, for purposes of real-time operation, averaging the two is prohibitively computationally intensive. Systems that perform the averages and a post-hoc segmentation based upon conditional random fields add significantly to the computational requirements rendering such methods impossible to function in real-time under current technological limitations.

Instead, the results are concatenated at 470. Then, a final convolutional layer merges the two maps into a single high-fidelity probability map (e.g. probability map 246 in FIG. 2) at 480. Further refinement is possible through the application of a standard graph cut algorithm at 490 which converts the probability map into a binary facial mask (i.e. identifying each pixel as either a probable facial or probable non-facial region). The image may then be returned to the original resolution using bilinear interpolation. This completes the facial segmentation portion of the overall process.

The processes described in FIG. 4 may intentionally be offloaded from a first computing device (e.g. computing device 120 from FIG. 1) to a second computing device (e.g. computing device 130 from FIG. 1). This may take place wirelessly or through a wired connection. Though these processes may be offloaded presently to enable real-time processing to take place, in the future, single computers or mobile devices may be capable of performing these processes without any need of offloading any aspect of the task.

Figure 5:
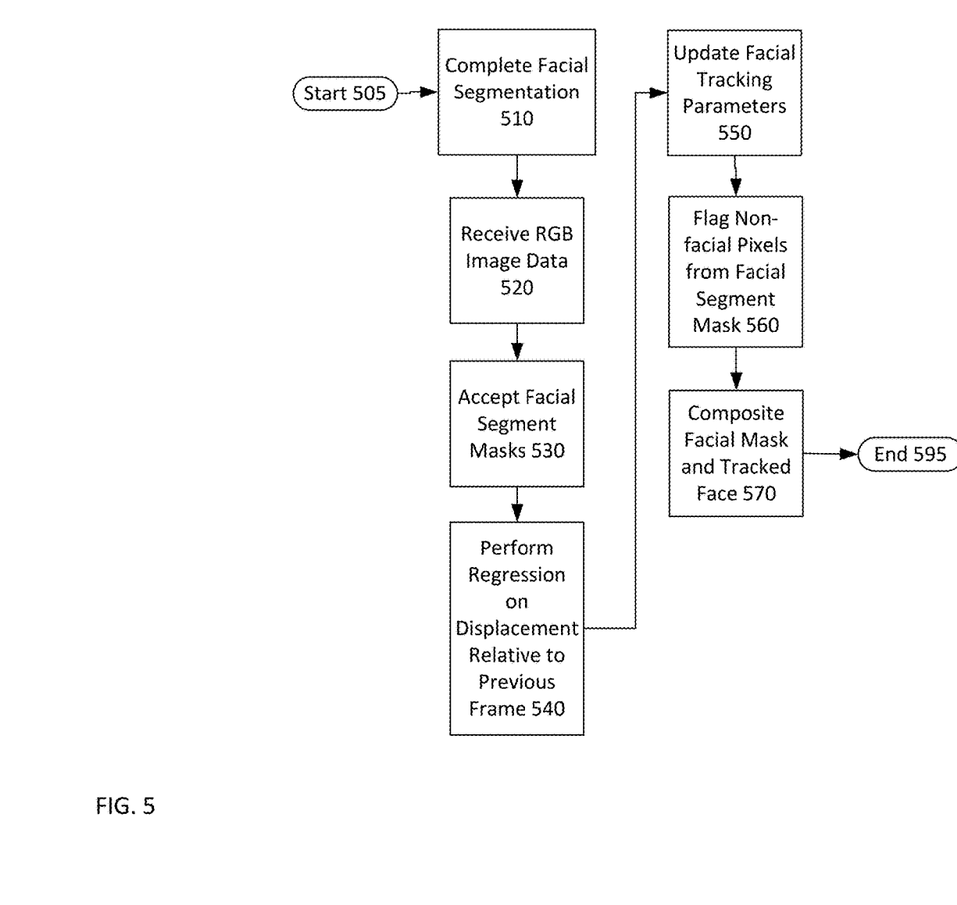
FIG. 5 is a flowchart of operation of performance capture and fusion of facial segmentation and performance capture in a system for real-time facial segmentation and performance capture from RGB input.

FIG. 5 is a flowchart of operation of performance capture and fusion of facial segmentation and performance capture in a system for real-time facial segmentation and performance capture from RGB input. FIG. 5 has a start 505 and an end 595, but as with FIG. 4 above, the processes described may take place many times in a second and many iterations of this process may be at various stages for each input frame of image data from a video stream.

After the state, once the facial segmentation (FIG. 4) is completed at 510, then the same RGB image data is received at 520 by the performance capture. However, to aid in this process, the facial segment masks created during facial segmentation (FIG. 4) are also accepted at 530.

Next, DDE (displaced dynamic expression) regression is performed on the current image frame, based in part upon the immediately preceding image frame at 540. With appropriate training, as discussed above, this results in a shape vector representative of the three-dimensional position, pose, and expression of any face in the image data. This tracking process may take place on a first computing device (e.g. computing device 120 of FIG. 1) substantially simultaneously with the above-described segmentation process taking place on a second computing device (e.g. computing device 130 of FIG. 1).

The facial tracking parameters are updated at 550 so as to identify the pose of the face within the current frame. Next, non-facial pixels from the facial segment mask 560 are flagged. This results in an understanding by the system of the pose and expression of the face, but identifies occluded or otherwise non-visible facial regions so that they are removed from the resulting composite facial mask.

A facial mask and/or tracked face is generated at 570. A facial mask or tracked face, which incorporates the segmented binary mask may be used to facial replacement (e.g. substituting a different face for the one identified in the image) or retargeting (replacing a face with something other than another face) subject to the desires of the user. Importantly, the speed at which this process can occur in video is real-time.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of performing facial segmentation and performance capture from RGB image data comprising:
   generating a lower-resolution image from the RGB image data;
   performing a convolution of the lower-resolution image to derive a probability map identifying probable facial regions and probable non-facial regions;
   performing a first deconvolution on the probability map using a bilinear interpolation layer to derive a set of coarse facial segments;
   performing a second deconvolution on the probability map using a series of unpooling, deconvolution, and rectification layers to derive a set of fine facial segments;
   concatenating the set of coarse facial segments to the set of fine facial segments to create an image matrix made up of a set of facial segments; and
   generating a binary facial mask identifying probable facial regions and probable non-facial regions from the image matrix.

2. The method of claim 1 further comprising applying a softmax operation on the image matrix along with a 1 by 1 convolution to generate a fused facial probability map prior to generation of the binary facial mask.

3. The method of claim 1 wherein the concatenating further comprises applying a 1 by 1 convolution.

4. The method of claim 3 wherein blending weights derived from training data are applied during the concatenating to each of the set of coarse facial segments and the set of fine facial segments.

5. The method of claim 1 further comprising performance capture by applying a displaced dynamic expression process to the binary mask.

6. The method of claim 1 further comprising upsampling the binary facial mask to match a resolution of the RGB image data.

7. The method of claim 1 further comprising reducing the filter weights of a first fully connected layer in the second deconvolution beginning with a 4 by 4 pixel layer to speed performance of the second deconvolution.

8. The method of claim 1 wherein the first deconvolution further comprises performing a pooling fusion of multiple pooling layers and an upsampling of the pooling fusion for use during the concatenating.

9. An apparatus comprising a storage device storing a program having instructions which when executed by a processor cause the processor to:
   generate a lower-resolution image from RGB image data;
   perform a convolution of the lower-resolution image to derive a probability map identifying probable facial regions and probable non-facial regions;
   perform a first deconvolution on the probability map using a bilinear interpolation layer to derive a set of coarse facial segments;
   perform a second deconvolution on the probability map using a series of unpooling, deconvolution, and rectification layers to derive a set of fine facial segments;
   concatenate the set of coarse facial segments to the set of fine facial segments to create an image matrix made up of a set of facial segments; and
   generate a binary facial mask identifying probable facial regions and probable non-facial regions from the image matrix.

10. The apparatus of claim 9 wherein the instructions further cause the processor to apply a softmax operation on the image matrix along with a 1 by 1 convolution to generate a fused facial probability map prior to generation of the binary facial mask.

11. The apparatus of claim 9 wherein the concatenating further comprises applying a 1 by 1 convolution.

12. The apparatus of claim 11 wherein, as a part of the concatenating, blending weights derived from training data are applied to each of the set of coarse facial segments and the set of fine facial segments.

13. The apparatus of claim 9 wherein the instructions further cause the processor to conduct performance capture by applying a displaced dynamic expression process to the binary mask.

14. The apparatus of claim 9 wherein the instructions further cause the processor to upsample the binary facial mask to match a resolution of the RGB image data.

15. The apparatus of claim 9 wherein the instructions further cause the processor to reduce the filter weights of a first fully connected layer in the second deconvolution beginning with a 4 by 4 pixel layer to speed performance of the second deconvolution.

16. The apparatus of claim 9 wherein the first deconvolution further comprises performing a pooling fusion of multiple pooling layers and an upsampling of the pooling fusion for use by the convolution during the concatenating.

17. The apparatus of claim 9 further comprising:
   the processor;
   a memory; and
   wherein the processor and the memory comprise circuits and software for performing the instructions on the storage device.

18. A system for performing facial segmentation and performance capture from RGB image data, the system comprising:
   an RGB camera for generating RGB image data;
   a processor for:
   generating a lower-resolution image from the RGB image data;
   performing a convolution of the lower-resolution image to derive a probability map identifying probable facial regions and probable non-facial regions;
   performing a first deconvolution on the probability map using a bilinear interpolation layer to derive a set of coarse facial segments;
   performing a second deconvolution on the probability map using a series of unpooling, deconvolution, and rectification layers to derive a set of fine facial segments;
   concatenating the set of coarse facial segments to the set of fine facial segments to create an image matrix made up of a set of facial segments; and generating a binary facial mask identifying probable facial regions and probable non-facial regions from the image matrix.

19. The system of claim 18 further comprising a graphics processing unit for conducting performance capture by applying a displaced dynamic expression process to the binary mask.

20. The system of claim 19 wherein the graphics processing unit is in a second computing device, distinct from a first computing device including the processor, and further wherein the process of conducting performance capture is performed by the second computing device with results returned to the first computing device.

* * * * *